D. Clark,
Mortising Machine.
Patented Sep. 14, 1836.
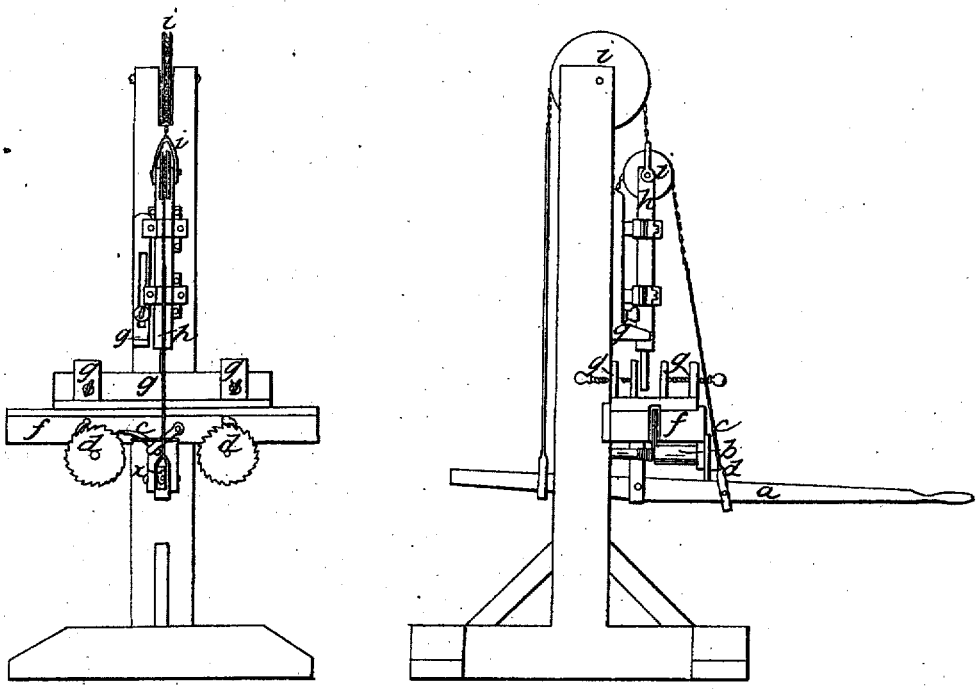
AM. PHOTO-LITHO. CO. N.Y. (OSBORNE'S PROCESS)

UNITED STATES PATENT OFFICE.

DAVID CLARK, OF BROOKLYN, CONNECTICUT.

MORTISING-MACHINE.

Specification of Letters Patent No. 24, dated September 14, 1836.

*To all whom it may concern:*

Be it known that I, DAVID CLARK, of Brooklyn, in the county of Windham and State of Connecticut, have invented a new and useful Improvement in Machines for Mortising Wood; and I do hereby declare that the following is a full and exact description thereof.

I take a piece of joist 3 feet long, across each end of which I frame another piece, two feet long, forming the foundation. In the center of this first piece, I place a joist perpendicular six feet long braced from the foundation. Two feet from the foundation I fasten with an iron bolt a piece of plank two feet long, and eight or nine inches wide crosswise of the perpendicular joist, and edgewise of the plank for a platform for a carriage to run upon. In the center of this platform on the underside I frame a short piece of joist, through which I place a lever about five feet long moving on a pin through this short piece of joist passing through a mortise in the perpendicular joist, and extending back of it one foot, the remainder of it coming forward near the end of which the hand, the hand is applied, to operate the machine by moving it up, and down, on each side of this lever, about three, or four inches from it, and underneath the platform I place a roller which is turned around by means of a dog acting on a ratchet wheel attached, to the front end of the roller; one half the lengths of these rollers is turned smaller than the other, in order that the cord which moves the carriage may be transferred from one part to the other to increase, or decrease the feed as the case may require. To do this more readily the cord is attached close to the end of the larger part so that by cutting a notch from it to the smaller it will wind on either part without difficulty. To move these rollers I made a dog with a joint in it, which I place on the front of the platform in such position that the joint will come directly over the lever, and a little below the platform when it hangs in its natural position, so that when the lever is raised it will hit the joint, straighten the dog, and force the ratchet wheel forward which is kept in place by a small dog placed over it. This first dog turns on a pin without a head and is kept on it by a wire bent to a right angle, one part of which is driven into the front of the platform, so that the other will turn directly over the dog. Another pin and wire is so placed that the same dog will operate upon the other ratchet wheel in the same manner when reversed. The lower part of this dog is kept in place by a guard passing across the outside of both parts of it. I make a carriage of a piece of a piece of plank to correspond with the platform, but enough narrower to admit of guides at the edges to keep it in place. At each edge of this carriage are two studs, through which, screws pass to regulate the piece to be mortised. In the under side of the carriage in the center, and from end to end I plow a groove of sufficient width, and depth to admit a small cord, attached in the middle, and passing over each end of the platform, on a pulley winds around the rollers before described to move the carriage either way. Above the carriage I place a slide of wood, or iron with a mortise through it which is regulated by a screw through the mortise entering the perpendicular joint, and is raised, or lowered as required, to prevent the piece to be mortised from rising, when the chisel is withdrawn. One foot above the carriage I fasten by screws, or otherwise a box, and six inches above that, another. These boxes stand out from the perpendicular joist, three and a half inches to the center of the aperture, this aperture is square one corner coming in front. The boxes are divided from corner to corner, and are tightened, or loosened by screws. A piston passes through these boxes an inch, and a half square, and eighteen, or twenty inches long, in the lower end of which I have either a round or square socket for the chisel, a little tapering with a hole drilled near the top for the purpose of starting it out. In the upper end of the piston I place a pulley four inches in diameter. Just upon the upper box I place a hook to which I attach one end of a chain, or rope passing over the pulley in the top of the piston downward, and attached to the lever, by an iron going both sides of the lever, through which and the lever a pin is passed; I have likewise extra holes both in the iron, and lever to raise or lower the piston, on the ends of the pins passing through the center of the pulley, and the top of the piston is a clevis to the curve of which I attach another chain, or rope passing over a pulley (the surface of which must be directly over the center of the piston) in the top of the perpendicular joint, and down on the back side where it is attached to the lever in the same manner as the other chain, or rope.

What I claim as my invention, and desire to secure by Letters Patent is—

1. The application of the power, by means, or lever moving on a fulcrum beneath the platform; a chain, or rope from the lever in front passing over a pulley in the top of the piston, and attached to the perpendicular joist, and the mode of raising the piston, by a chain, or rope attached at the top of the piston passing over a pulley at the top of the perpendicular joist, downward, and attached to the back end of the lever.

2. In regard to the carriage its movement by means of a cord winding around a roller, turned by a dog acting on a ratchet wheel on the roller, the manner of communicating motion to the dog, by the lever, and the manner of regulating the feed by having the roller of different diameters in its different parts, together with the particular arrangement of the apparatus for moving the carriage, described in the specification.

DAVID CLARK.

Witnesses:
HARVEY HYDE,
BATHSHEBA METCALF.